United States Patent
Harel et al.

(10) Patent No.: US 9,357,401 B2
(45) Date of Patent: May 31, 2016

(54) METHOD AND APPARATUS FOR ADAPTIVE REDUCTION OF INTERFERENCE IN A SMALL CELL OF A MOBILE TELECOMMUNICATION SYSTEM

(75) Inventors: Haim Harel, New York, NY (US); Phil Chen, Denville, NJ (US); Kenneth Kludt, San Jose, CA (US)

(73) Assignee: Google Inc., Mountain View, CA (US)

( * ) Notice: Subject to any disclaimer, the term of this patent is extended or adjusted under 35 U.S.C. 154(b) by 161 days.

(21) Appl. No.: 14/236,115

(22) PCT Filed: Aug. 3, 2012

(86) PCT No.: PCT/US2012/049427
§ 371 (c)(1),
(2), (4) Date: Jan. 30, 2014

(87) PCT Pub. No.: WO2013/022723
PCT Pub. Date: Feb. 14, 2013

(65) Prior Publication Data
US 2014/0162679 A1 Jun. 12, 2014

Related U.S. Application Data

(60) Provisional application No. 61/515,521, filed on Aug. 5, 2011.

(51) Int. Cl.
*H04W 72/00* (2009.01)
*H04W 16/14* (2009.01)
*H04W 16/28* (2009.01)
(Continued)

(52) U.S. Cl.
CPC .............. *H04W 16/14* (2013.01); *H04L 5/0032* (2013.01); *H04W 16/28* (2013.01); *H04W 16/32* (2013.01); *H04W 84/045* (2013.01)

(58) Field of Classification Search
CPC .... H04B 7/0617; H04B 7/024; H04B 7/0456; H04B 7/0413; H04B 7/0695; H04B 7/0408; H04B 7/0626; H04B 7/0417; H04B 7/0452; H04B 7/0619; H04B 7/0632; H04B 15/00; H04B 17/345; H04B 17/382; H04B 7/043; H04W 72/082; H04W 24/02; H04W 16/14; H04W 84/045; H04W 88/08; H04W 52/146; H04W 52/40; H04W 16/28; H04W 52/143; H04W 52/24; H04W 52/243; H04W 16/10; H04W 36/20; H04W 52/08; H04W 16/18
USPC ............................................ 455/452.2, 550.1
See application file for complete search history.

(56) References Cited

U.S. PATENT DOCUMENTS 5,175,867 A * 12/1992 Wejke ................... H04W 36/30
455/438
8,358,624 B1 * 1/2013 Ghaus ............... H04W 36/0061
370/331
(Continued)

FOREIGN PATENT DOCUMENTS

| EP | 1079544 | 2/2001 |
|---|---|---|
| WO | 2009/070606 | 6/2009 |

OTHER PUBLICATIONS

International Search Report and Written Opinion, European Intellectual Property Office, Application No. PCT/US2012/049427, Oct. 31, 2012.

*Primary Examiner* — Nimesh Patel
(74) *Attorney, Agent, or Firm* — Troutman Sanders LLP; James E. Schutz; Andrew C. Doherty

(57) ABSTRACT

In a cell phone telecommunication system having a macrocell and a small cell coextensive with or adjacent to the macrocell and sharing a common frequency band, interference can occur between a user device operating in the small cell, the local base station operating the user devices in the small cell on one hand and another user device serviced by a main base station for the macrocell. In order to reduce this interference, the shape of the transmission beam from at least one of the user devices or base stations is shaped into a narrow beam steered to be directed at the respective receiving unit. Alternatively, the shape of the transmission beam has a null point and the beam is steered so that its null point is directed toward the affected unit.

20 Claims, 3 Drawing Sheets

(51) Int. Cl.
    *H04L 5/00*     (2006.01)
    *H04W 16/32*     (2009.01)
    *H04W 84/04*     (2009.01)

(56)     References Cited

U.S. PATENT DOCUMENTS

2008/0026763 A1    1/2008    Van Rensburg et al.

2008/0090575 A1*    4/2008    Barak .................. H04B 7/0417
                                                         455/444
2009/0137221 A1*    5/2009    Nanda .................... H04W 74/04
                                                         455/296
2010/0273498 A1    10/2010    Kim et al.
2010/0323711 A1    12/2010    Damnjanovic et al.
2012/0076039 A1    3/2012    Kwon et al.
2012/0115497 A1    5/2012    Tolli et al.

\* cited by examiner

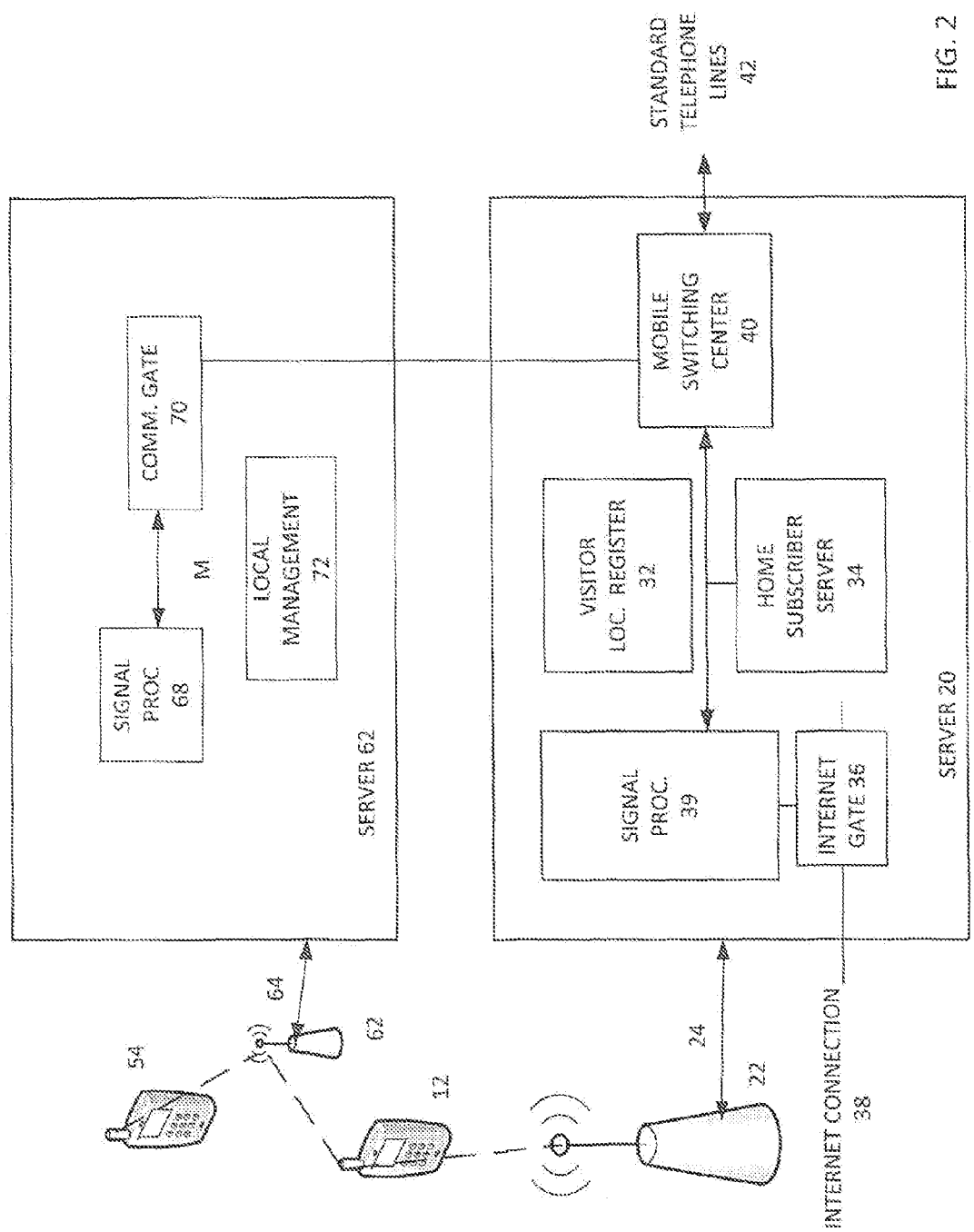

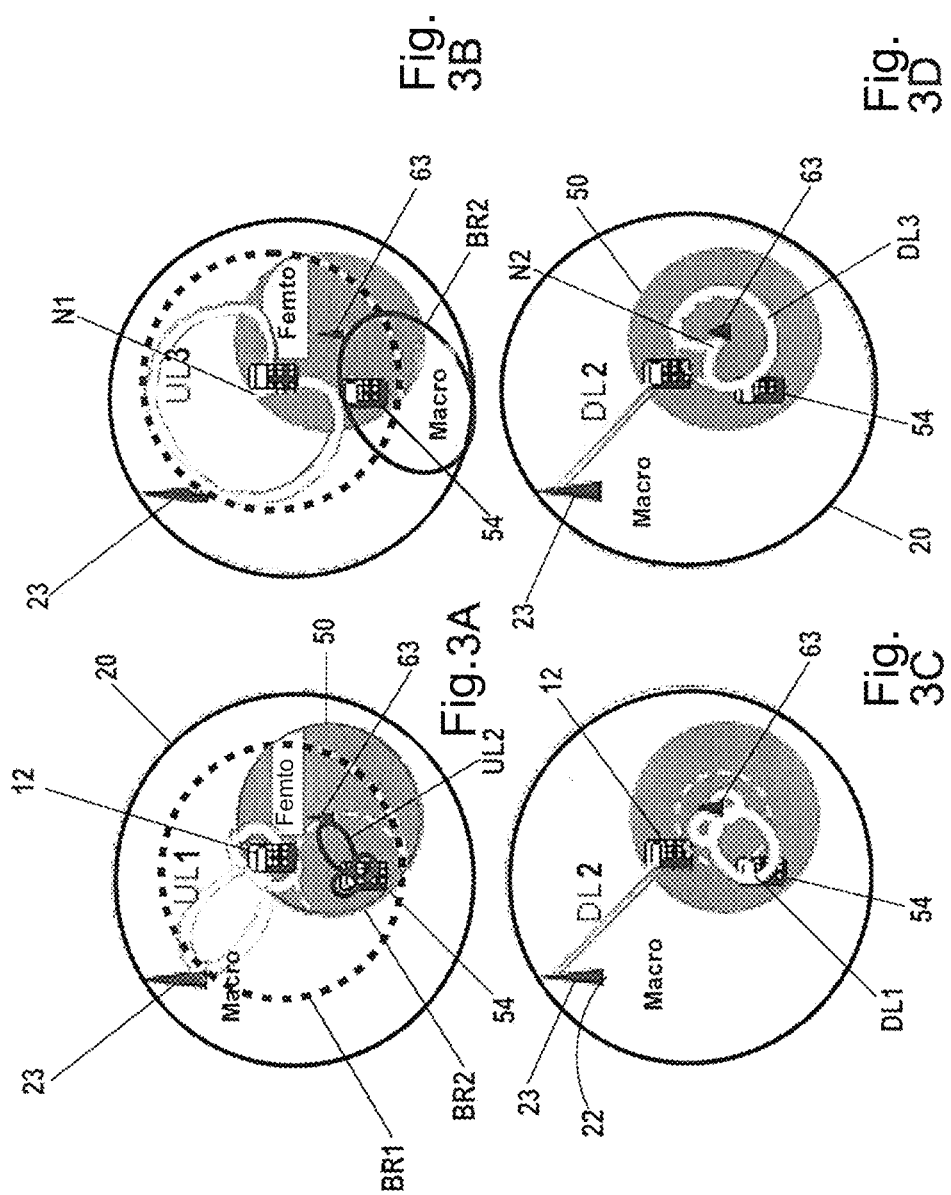

METHOD AND APPARATUS FOR ADAPTIVE REDUCTION OF INTERFERENCE IN A SMALL CELL OF A MOBILE TELECOMMUNICATION SYSTEM

RELATED APPLICATIONS

This application claims priority to U.S. Provisional Application Ser. No. 61/515,521 filed on Aug. 5, 2011 and incorporated herein in its entirety.

FIELD

This application pertains to devices operating in a mobile telecommunication system including a small cell, and more particularly to devices operating in or adjacent to the small cell, the devices having antennas that are adaptively optimized to reduce interference between such devices while they are uploading or downloading signals. The application further covers methods for reducing the interference.

BACKGROUND

Mobile telephone systems have become very popular in recent years to the point where they are preferred over standard landline telephone systems by individuals and enterprises alike. One problem with mobile telephone systems is that they rely on cells extending over well-defined geographic areas traditionally served by a main base station. However, service for devices operating at the fringe of a cell is frequently intermittent or has a low quality. Moreover, as more and more devices are active within a cell, the cell's capacity to service the devices is strained and communication with the devices becomes poor. A further disadvantage is that because of local conditions within a cell area (for example, inside a building, or in an underground location), communications with certain devices may be severely attenuated and it is difficult if not impossible to service such devices from the main base station.

Moreover, some entities, including enterprises, may find it desirable to control communications with certain devices within a limited section of the cell, for example, inside a factory, or other facility. The standard protocols used for communications within a traditional cell area do not permit such functionality.

One solution to reduce these problems involves providing one or more small cells that are disposed physically either within a main cell or at its fringe. Each small cell is provided with a low power local base station communicating with the main base station via DSL, cable or broadband or other conventional communication channels. Devices within the small cell normally communicate with the local base station and not the main base station. Importantly, all communications between the devices and both the main and the local base stations are performed within the same frequency channels using a conventional protocol, such as WDCMA, GSM, CDMA2000, TD-SCDMA, WiMax, LTE, etc. Small cells can be categorized based on their operating range as femtocells (with a range of about 10 m), picocells (with a range of about 10-200 m) or microcells (with a range of 200-2000 m). In this environment, a main cell is termed a macrocell. The type of small cell depends obviously on the size of the respective area that must be serviced by it. For example, picocells are suitable for residences or a floor in a multi-storied building.

Small cell service is available from many mobile operators, such as Vodaphone, AT&T, Sprint, Verizon, etc. A small cell service is advantageous to a mobile operator because it improves the coverage and increases the capacity of the respective macrocell. Consumers additionally benefit from a small cell because they get better voice quality; an increase in the battery life in their devices because of lower power requirements, and can use them to define a closed network.

Small cells can be operated in an open mode in which the small cell is available to any device within its coverage area, or in a closed mode in which devices must be registered or subscribed with the local base station before they can operate with the small cell. In other words, in an open small cell, a device within the small cell coverage area is serviced by the local small cell base station. As the device moves out of the small cell into the macrocell, it is seamlessly handed off to the main base station. An unsubscribed device in a closed small cell is ignored by the local base station and must be serviced by the main base station, if possible.

A problem with a mobile telephone system with a macrocell and one or more small cells is that the imbalance between the EIRP (Effective Isotropically Radiated Power) of devices served by the different base stations can cause serious interference between the two devices. Until now, this interference could be reduced only by reducing the range of the small cell so that both devices are served by the main base station. Obviously this is unsatisfactory because it defeats the purpose of defining a small cell.

In a picocell, this interference may be very pronounced, appearing as a mutual interference resulting in a poor signal-to-noise ratio during downloads to a device as well as uploads to the main base station.

Similarly, an unsubscribed device within a femtocell must be serviced by the main base station. This causes interference both for downloads by other subscribed devices and uploads to the local base station.

The present disclosure solves these problems, so that the benefits of small cells are not lost.

SUMMARY

In a system providing cell phone communications using a macrocell and a small cell sharing a common frequency band, there may be several units, including a first unit exchanging signals with a second unit within said small cell, and a third unit being serviced within said macrocell. The term unit is used here to refer generically either to a user device within a macrocell or small cell, or a base station servicing one or more user devices.

As described herein, the first unit includes a composite antenna generating a transmission beam to the second unit, the transmission beam having a beam direction; and a signal processor receiving input signals and generating transmission signals to be transmitted to the second unit by the composite antenna as said transmission beam. The signal processor is adapted to select the beam direction to minimize interference between said transmission beam and download signals to the third unit. The first unit could be a user device or the local base station. The third unit is normally a user device.

The processor is adapted to shape the transmission beam to have a narrow beam shape oriented in a beam direction related to the apparent position of the second unit with respect to the first unit.

Alternatively, the processor is adapted to shape the beam to have a null point at the apparent position of the third unit with respect to the first unit.

In one example, the signal processor is adapted to determine the apparent direction of the second unit with respect to the first unit, or the apparent direction of the third unit with respect to the first unit. It cannot determine direction or apparent direction. It only looks are a set of "beam pointing parameters" that produce an effect (e.g., power down commands) and compares with another.

In another aspect of the disclosure, there is described a user device operating in a cell phone system including a macrocell serviced by a main base station and a small cell sharing a frequency band with the macrocell and being serviced by a local base station. The user device includes a multiphase antenna; and a signal processor receiving transmission signals and cooperating with the antenna to generate a transmission beam having a beam directed to said small cell, said transmission beam corresponding to said transmission signals. The signal processor determines the beam direction based on the relative direction of another user device serviced by said main base station. More specifically, the transmission beam is selected to minimize interference with the transmissions from the other unit to the base station.

In another aspect of the disclosure, there is a cell communication system including a macrocell and a small cell operating in a common frequency range. There is also a first and second unit operating in the small cell and a third unit being serviced from the third cell. A method of reducing interference between units operating within said small cell and the third unit operating in the macrocell, includes the steps of determining the apparent direction of one of the second and third unit from said first cell; and transmitting signals from said first cell to said second cell using a transmission beam having a beam shape and a beam direction, said beam direction being selected based on said apparent direction.

BRIEF DESCRIPTION OF THE FIGURES

FIG. 2 shows a block diagram of the main and local base stations;
FIG. 3A-3D show somewhat diagrammatically some characteristic beams shaped and steered to eliminate or reduce interference between two devices.

DETAILED DESCRIPTION

Figure 1:
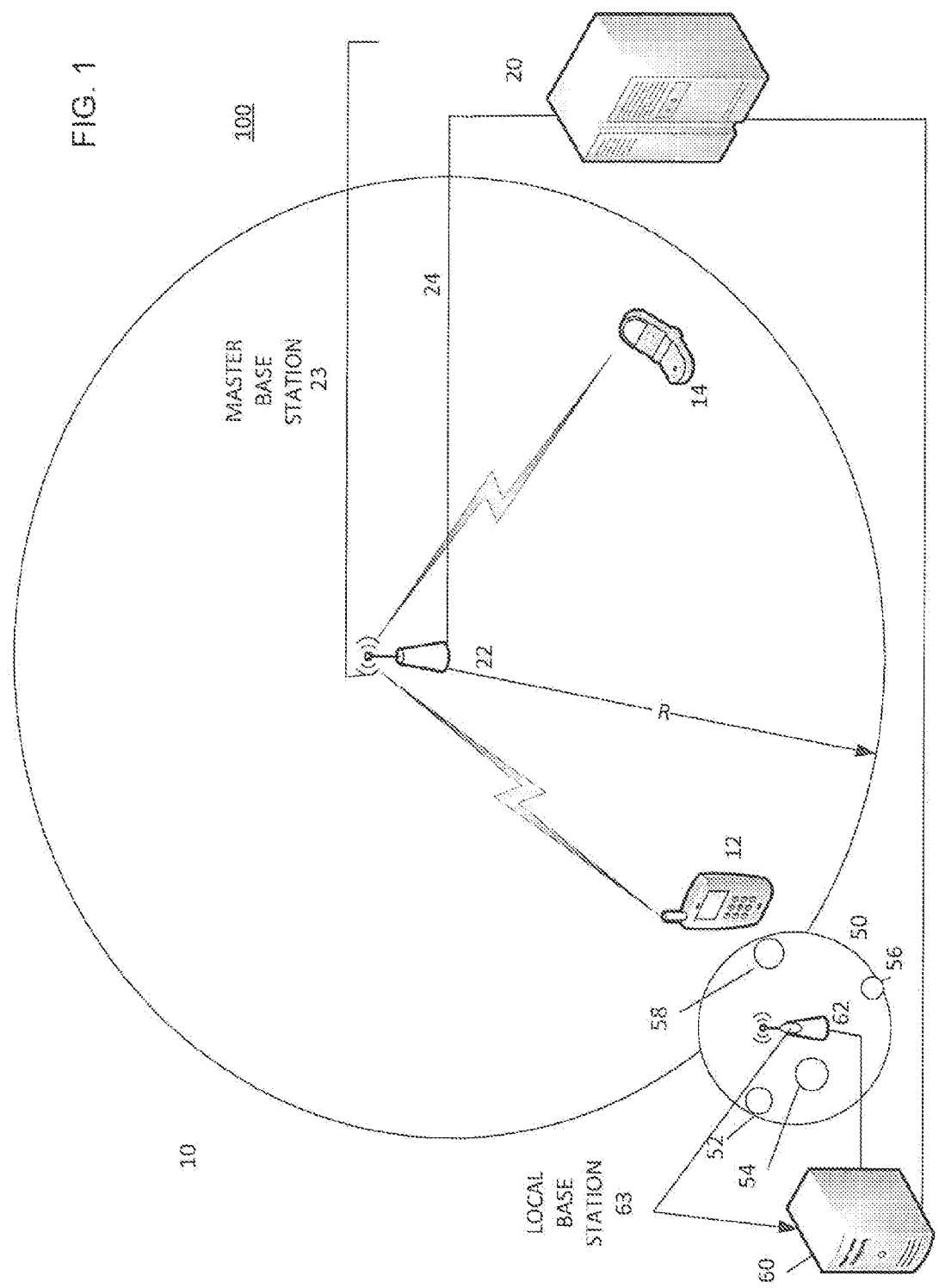
FIG. 1 shows a mobile telephone system having a macrocell and a small cell.

Transmission beams of various shapes are shown and discussed as being directed toward a particular unit of a communication system, or being directed away from another unit, wherein a unit can be either a user device or a base station. Of course, it should be understood that, because of reflections by various objects between two units of any system, as well as other often variable factors, in most instances the beams do not travel in a straight line and, therefore, it is more convenient to think of these beams as being directed at the apparent positions and/or directions of the respective units rather than repeatedly referring to their actual transmission paths.

As shown in FIG. 1, a mobile telephone communication system 100 includes a macrocell 10 having a range R. Devices 12, 14 within the macrocell 10 are serviced by a main base station 23 including a main server 20 and a main antenna 22 connected to the main server by a cable 24. The system 100 further includes a small cell 50 with a range r servicing several devices 52, 54, 56, 58 with a local base station. The local base station 63 includes a local server 60 and a local antenna 62 connected to the local server 60 by a cable 64. The local server 60 is connected to the main server by a broadband communication channel 66. As can be seen in this Figure, mobile device 12 may become located very close to the edge of small cell 50 and therefore interference may occur as various devices communicate with the respective base stations, as discussed in more detail below.

As shown in FIG. 2, the local server 50 includes a signal processor 68 for processing the signals to and from the antenna 62. Signals for the main processor 20 are exchanged through a communication gate 70. A local manager 72 keeps track of the devices 52-58 within the range r serviced by the local base station.

The main server 20 includes a signal processor 30 processing the signals to and from the antenna 22. Information about visitors are maintained in a databank 32 while a home subscriber server 34 keeps track of subscriber devices for the macrocell 20. In addition, the server 20 provides internet access through an Internet gate 36 and Internet connection 38. Mobile switching center 40 provides connection to devices served by other systems through a standard landline telephone connection 42.

As previously discussed, devices in or near the range of small cell 50 can cause various interferences. If the range r of small cell 50 is reduced temporarily to avoid this interference, a local subscriber device 54 or 56 is left behind and can no longer be served by the local base station but must be served by main base station 23.

In the present system, the devices and base stations use multiple antennas (not shown) and they operated in a manner so as to customize the shapes and the directions of the beams generated by the antennas. These beams are optimized to eliminate, or at least reduce interferences. The beam shaping and steering techniques used here are well known and include controlling the amplitudes and the relative phases of the signals applied to the antenna elements.

One well known technique for generating and steering an effective but narrow beam is known as transmission diversity (TD) as described in U.S. Pat. No. 7,633,905.

Another technique referred to as zero-forcing or null-steering (NS) technique is used to generate a null point transmission beam. This technique is used to generate a beam having a null (i.e. nodal) point in a direction in which the beam intensity must be minimized. Other beam shaping techniques are known in the art, including both cooperative (closed loop) and non-cooperative (open loop) techniques (such as Open- and Closed-Loop Transit Diversity—OLTD, CLTD) and can be used as well.

FIGS. 3A-3D show how some of these techniques are used to eliminate or reduce interference. For the sake of clarity, the base stations 23, 63 are represented in these figures as a respective antenna.

In FIG. 1, the small zone 50 was disposed near the edge of macrocell 20; however, the processes described are also applicable for small cells that are contained inside a macrocell. One such configuration is shown in FIG. 3A. In this configuration, the macrocell 20 surrounds the small cell 50 and is generally serviced by master base station 23, while the small cell 50 is serviced by local base station 63.

The cells may include several devices, however only two such devices 12, 54 are shown. Small cell 50 is a closed cell with device 54 being a subscriber device and device 12 being a nonsubscriber device. Therefore, while both devices are physically inside small cell 50, only device 54 is serviced by local base station 63. Device 12 is serviced through master base station 23, however, the local base station 63 eavesdrops on the transmissions between device 12 and master base station 23 and sends commands to device 12 to reduce interference within the small zone 50 as discussed below.

Each device 12, 54 receives control commands, such as power up/down directions from both the master base station 23 and the local base station 63 and can identify which is sending them. When the local base station 23 the device 12 serviced by the master base station 23 to go down in power, the device 12, rather than reducing its power, uses the NS technique to generate a signal having a null point N1 that is directed toward the local base station 63. Then, if necessary, it may still be able to maintain or increase the power of the upload signal UL3 to talk to its master base 23 station in spite of the fact its beam is no longer pointing directly to it.

As described above, the device 12 can be adversely affected because the signal it receives from base station 23 (hereinafter the DL signal) could be degraded by jamming from the base station 63 (e.g., the DL signal from base station 63 to device 54). In addition, the UL signals from the device 54 can be degraded by jamming (UL signals) from device 12.

As is conventional in the art, the transmission beams of various shapes are shown and discussed as being directed toward a particular unit of a communication system, or being directed away from another unit thereof. Of course, as stated above, it should be understood that because of reflections by various objects between two units of any system as well as other factors, in most instances the beams do not travel in a straight line and, therefore, it is more convenient to think of these beams as being directed at the apparent positions or directions of the respective units rather than actual transmission paths.

One embodiment has one or both devices 12, 54 shape the UL beams using mobile transmit diversity (MTD) techniques or other similar techniques generating relatively narrow focused beams, directed at the respective antenna. When the MTD technique is used, the interference between signals from the devices is reduced by approximately 3 db compared to a standard omnidirectional beam. The directions of the respective UL beams are determined using conventional quality parameters, such as the ones discussed in more detail below.

FIG. 3A shows a configuration for minimizing interference for UL transmissions using MTD or other techniques for generating a generally narrow directional beam. Normally, device 12 generates an omnidirectional beam BR1 to reach master base station 23. Unfortunately, this beam BR1 also encompasses device 54 and the antenna of base station 63 and creates interference in both UL and DL transmissions. To reduce this interference, at the request of the local base station 63, device 12 shapes its UL transmission through the main base station 23 to generate a beam UL1. This beam UL1 avoids both device 54 and the antenna of local base station 63 and hence avoids interference with the transmissions between device 54.

In the configuration of FIG. 3A, the device 54 can maintain its omnidirectional UL beam. However, if devices 12 and 54 get too close to each other, UL transmissions from device 54 may interfere with transmissions involving device 12. Therefore, at the request of the master base station 23, device 54 can shape its beam, using for example MTD, to form a narrow beam UL2 directed at local base station 63.

Even better results are expected if an NS (Null Steering) beam shaping technique is used with the null point being directed at the competing signal source. Using this technique, it is expected that interference can be reduced by 6-10 db. This technique requires a non-cooperative mode.

The NS technique, as previously discussed requires that a minimum signal quality be achieved in a selected direction. For example, for systems using CDMA, UMTS or HSPA protocols the quality indicator could be the fast control power emitted by the competing (or victim) signal source. A beam may be steered until the ratio of the PCB or TPC signals is maximized.

The GSM and LTE protocols do not use spread spectrum as a multiple access method and therefore, for these protocols, another quality parameter may be selected. For example the pilot signals/reference signals of the competing transmitter may be maximized.

Another quality indicator that can be used for steering beams from the local antenna may be determined by the local base station eavesdropping on UL transmissions from device 12 to the main base station 23. For example, the CQI parameter can be monitored and the beams from device 12 can be steered using the NS technique to maximize this parameter. Alternatively, the number of retransmission requests can also be monitored and the beam can be steered to minimize this parameter. For example, the UL beam from device 12 can be steered until the number of retransmission requests from the master base station attains a level at which the device 12 is requested to retransmit a communication no more than 2 or 3 times. This information is obtained by the local base station 63 from the master base station 23.

FIG. 3B shows a configuration similar to that of FIG. 2A. In this configuration, instead of using a narrow beam UL1, device 12 generates an upload beam UL3 that has been shaped and steered using the NS steering technique discussed above. As can be seen in FIG. 3B, the beam UL3 has a null point in the direction of the antenna 62 of local base station 63 and therefore if the device 54 generates an uploading beam BR2 (e.g., an omnidirectional beam), interference between UL4 and UL3 is minimized at the antenna of the base station 63.

There are at least two significant differences between the approaches in FIGS. 3A and 3B. In FIG. 3A, beam UL1 is a narrow beam directed towards the antenna of the intended target, in this case the antenna of main base station 23. In FIG. 3B, beam UL4 is shaped and steered so that it has a null point in the direction of the unintended or victim antenna, in this case the antenna of local base station 63.

FIGS. 3C and 3D show how the device 12 may be protected from interference due to download signals from the local base station 63 to device 54. In FIG. 3C, antenna 62 generates a download beam DL1 shaped using TD and steered toward device 54 as show. The antenna 22 downloads signals DL2 to device 12 at the same time however because of the shape of beam DL1, the interference at device 12 is reduced. FIG. 3D shows a configuration similar to FIG. 3C except that instead of generating a beam DL1, the antenna of local base station 63 generates a beam DL3 shaped and steered using an NS steering technique. In this case the null point N2 of beam DL3 is directed toward device 12.

Numerous modifications may be made to the system and methods described herein without departing from the scope as this application as set forth in the appended claims.

We claim:

1. A local base station in a system providing cell phone communications using a macrocell and a small cell sharing a common frequency band, wherein the macrocell is serviced by a master base station and the small cell is serviced by the local base station, said unit being a local base station exchanging signals with a first user device within said small cell, in which second user device is serviced within the macrocell via communication with the master base station, said local base station comprising:

a composite antenna for receiving communications between the second user device and the master base station and for transmitting command signals to the second user device to instruct the second user device to select a beam direction to reduce interference within the small cell; and wherein the second user device includes:
- a composite antenna, for receiving command signals from said local base station and for generating a transmission beam to the master base station, the transmission beam having a beam direction; and
- a signal processor, responsive to receiving command signals from said local base station, for generating transmission signals to be transmitted to the master base station by said composite antenna as the transmission beam, wherein said signal processor is adapted to select the beam direction to minimize interference between the transmission beam and download signals from the local base station to the first user device.

2. The unit of claim 1 wherein said signal processor is adapted to shape said transmission beam to have a narrow beam shape oriented in a beam direction related to the apparent position of said master base station with respect to said second user device.

3. The unit of claim 1 wherein said signal processor is adapted to shape said beam shape into a null point shape having a null point, the direction of said null point beam being selected in accordance with an apparent position of the local base station with respect to said second user device.

4. The unit of claim 1 wherein said transmission beam carries an upload signal.

5. The unit of claim 1 wherein said transmission beam carries a download signal.

6. The unit of claim 1 wherein said signal processor is adapted to determine the apparent direction of the master base station with respect to the second user device.

7. The unit of claim 1 wherein said signal processor is adapted to determine the apparent direction of the local base station with respect to the second user device.

8. A user device operating in a cell phone system including a macrocell serviced by a main base station and a small cell sharing a frequency band with the macrocell and being serviced by a local base station, said user device comprising:
- a multiphase antenna, for receiving a command signal from the local base station instructing the user device to reduce interference within the small cell, where said local base station sends the command signal in response to receiving signals being communicated between the main base station and the user device; and
- a signal processor for receiving transmission signals and for cooperating with said multiphase antenna to generate a transmission beam having a beam direction to said main base station, said transmission beam corresponding to said transmission signals, said signal processor determining said beam direction based on the relative direction of another user device serviced by said local base station, said transmission beam being selected to minimize interference with the transmissions from said local base station to said another user device, wherein the signal processor generates the transmission beam in response to receiving the command signal from the local base station.

9. The user device of claim 8 wherein the transmission beam has a beam shape, and said signal processor is adapted to set the beam as a narrow beam oriented in the apparent direction of the main base station.

10. The user device of claim 8 wherein said transmission beam has a beam shape, and said signal processor is adapted to setting said transmission beam to have a null void shape in a beam direction dependent on the relative position of the another user device.

11. A method of reducing interference in a cell communication system between a local base station and a first user device operating within a small cell and a second user device operating in a macrocell serviced by a master base station, said macrocell and said small cell operating in a common frequency range, said second user device being serviced from the macrocell, said method comprising the steps of:
- receiving, by the local base station, signals being communicated between the second user device and the master base station;
- determining, by the local base station and responsive to receiving signals being communicated between the second user device and the master base station, that the communications from the second user device to the master base station are likely to interfere with communications between the local base station and the first user device;
- transmitting, by the local base station, command signals to the second user device, wherein the command signals instruct the second user device to reduce interference within the small cell;
- responsive to receiving the command signals, determining, by the second user device, the apparent direction of one of the master base station and local base station, and transmitting signals, by the second user device the master base station using a transmission beam having a beam shape and a beam direction, said beam direction being selected based on said apparent direction.

12. The method of claim 11 further comprising determining a set of beam pointing parameters that reduces the interference for at least one of the local base station and the first user device, and applying said parameters to said signals, such that said signals can be transmitted to the master base station without interfering with communications between the local base station and the first user device.

13. The method of claim 11 wherein said apparent direction is the apparent direction of the master base station and wherein said transmission beam has a narrow beam shape.

14. The method of claim 11 wherein the apparent direction is the apparent direction of the local base station and the transmission beam is a null point beam.

15. The method of claim 11 wherein said step of determining the apparent direction is based open loop technique.

16. The method of claim 11 wherein said step of determining the apparent direction is based on a closed loop technique.

17. The method of claim 11 wherein said small cell is one of a minicell, a picocell and a femtocell.

18. The method of claim 11 wherein the small cell is a closed cell.

19. The method of claim 11 wherein the small cell is disposed within the macrocell.

20. The method of claim 11 wherein the small cell is disposed peripherally of the macrocell.

* * * * *